(12) United States Patent
Sandler et al.

(10) Patent No.: US 9,709,913 B2
(45) Date of Patent: Jul. 18, 2017

(54) CONCENTRATING AN INK COMPOSITION

(71) Applicant: Hewlett-Packard Indigo B.V., Amstelveen (NL)

(72) Inventors: Mark Sandler, Nes Ziona (IL); Daniel Skvirsky, Nes Ziona (IL); Inna Tzomik, Nes Ziona (IL); Hannoch Ron, Nes Ziona (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 0 days.

(21) Appl. No.: 15/104,034

(22) PCT Filed: Jan. 15, 2014

(86) PCT No.: PCT/EP2014/050738
§ 371 (c)(1),
(2) Date: Jun. 13, 2016

(87) PCT Pub. No.: WO2015/106811
PCT Pub. Date: Jul. 23, 2015

(65) Prior Publication Data
US 2016/0313662 A1   Oct. 27, 2016

(51) Int. Cl.
G03G 9/125 (2006.01)
G03G 9/12 (2006.01)
G03G 9/13 (2006.01)
C09D 11/02 (2014.01)
G03G 9/08 (2006.01)

(52) U.S. Cl.
CPC ............... *G03G 9/12* (2013.01); *C09D 11/02* (2013.01); *G03G 9/0804* (2013.01); *G03G 9/125* (2013.01); *G03G 9/13* (2013.01); *Y02P 20/544* (2015.11)

(58) Field of Classification Search
CPC ........ G03G 9/12; G03G 9/0804; G03G 9/125; C09D 11/02; Y02P 20/544
See application file for complete search history.

(56) References Cited

U.S. PATENT DOCUMENTS

| | | | |
|---|---|---|---|
| 3,405,683 A | 10/1968 | Jons et al. | |
| 3,900,003 A | 8/1975 | Sato et al. | |
| 4,073,266 A | 2/1978 | Arneth et al. | |
| 4,342,823 A | 8/1982 | Grant et al. | |
| 4,400,079 A | 8/1983 | Landa | |
| 4,504,138 A | 3/1985 | Kuehnle et al. | |
| 4,690,539 A | 9/1987 | Radulski et al. | |
| 4,842,743 A | 6/1989 | Yoshida et al. | |
| 5,391,453 A | 2/1995 | Ong | |
| 5,591,559 A | 1/1997 | Odell | |
| 5,749,032 A | 5/1998 | Landa et al. | |
| 6,183,931 B1 | 2/2001 | Odell | |
| 8,362,198 B2 | 1/2013 | Shindo et al. | |
| 2005/0007430 A1 | 1/2005 | Rowe et al. | |
| 2006/0257778 A1 | 11/2006 | Kikawa et al. | |
| 2012/0105554 A1* | 5/2012 | Chun ................ | B41J 2/1714 347/85 |
| 2013/0038667 A1* | 2/2013 | Bachar .............. | G03G 15/104 347/85 |

FOREIGN PATENT DOCUMENTS

WO   2007130069   11/2007
WO   2011001199   1/2011

OTHER PUBLICATIONS

International Search Report and Written Opinion dated Aug. 4, 2014 for PCT/EP2014/050738 filed Jan. 15, 2014, Applicant Hewlett-Packard Indigo B.V.
Particle Size Distribution by Laser (Malvern), GEA Niro Method No. A 8 d, Sep. 2005, http://www.niro.com/niro/cmsdoc.nsf/WebDoc/ndkw6u9by4, accessed Sep. 1, 2014.
Katz, Carbon Dioxide Decaffeination Process Article, Scientific American, Jun. 1997, http://www.scientificamerican.com.

* cited by examiner

*Primary Examiner* — Thorl Chea
(74) *Attorney, Agent, or Firm* — HP Inc. Patent Department

(57) ABSTRACT

Herein is disclosed a method for processing a liquid electrostatic ink composition, the method comprising:
   providing an initial liquid electrostatic ink composition comprising chargeable toner particles dispersed in a first liquid carrier,
   removing at least some of the liquid carrier from the initial liquid electrostatic ink composition using supercritical fluid extraction to provide a concentrated composition comprising the chargeable toner particles,
   adding a second liquid carrier to the concentrated composition to form a final liquid electrostatic ink composition. Also disclosed herein is a liquid electrostatic ink composition producible according to the method.

16 Claims, No Drawings

CONCENTRATING AN INK COMPOSITION

BACKGROUND

In general, electrostatic printing processes involve creating an image on a photoconductive surface, applying an ink having charged particles to the photoconductive surface, such that they selectively bind to the image, and then transferring the charged particles in the form of the image to a print substrate.

The photoconductive surface is typically on a cylinder and is often termed a photo imaging plate (PIP). The photoconductive surface is selectively charged with a latent electrostatic image having image and background areas with different potentials. For example, an electrostatic ink composition comprising charged toner particles in a liquid carrier can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member, which can be a soft swelling blanket, and then to the print substrate.

DETAILED DESCRIPTION

Before more detail is given about the present disclosure, it is to be understood that it is not limited to the particular process steps and materials disclosed herein because such process steps and materials may vary somewhat. It is also to be understood that the terminology used herein is used for the purpose of describing particular examples only. The terms are not intended to be limiting because the scope of the present invention is intended to be limited only by the appended claims and equivalents thereof.

It is noted that, as used in this specification and the appended claims, the singular forms "a," "an," and "the" include plural referents unless the context clearly dictates otherwise.

As used herein, "liquid carrier", "carrier liquid," "carrier," or "carrier vehicle" refers to the fluid in which the polymers, particles, colorant, charge directors and other possible additives can be dispersed to form a liquid electrostatic ink or electrophotographic ink.

Carrier liquids can include a mixture of a variety of different agents, such as surfactants, co-solvents, viscosity modifiers, and/or other possible ingredients.

As used herein, "electrostatic ink composition" generally refers to a ink composition in liquid form that is typically suitable for use in an electrostatic printing process, sometimes termed an electrophotographic printing process.

As used herein, "pigment" generally includes pigment colorants, magnetic particles, aluminas, silicas, and/or other ceramics or organo-metallics, whether or not such particulates impart color. Thus, though the present description primarily exemplifies the use of pigment colorants, the term "pigment" can be used more generally to describe not only pigment colorants, but other pigments such as organometallics, ferrites, ceramics, etc.

As used herein, "copolymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly or indirectly via an intermediate transfer member to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involves subjecting the electrostatic ink composition to an electric field, e.g. an electric field having a field gradient of 1000 V/cm or more, e.g. an electric field having a field gradient of 1500 V/cm or more.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Unless otherwise stated, any feature described herein can be combined with any aspect of the invention or any other feature described herein.

In an aspect, there is provided a method for processing a liquid electrostatic ink composition, the method comprising:
  providing an initial liquid electrostatic ink composition comprising chargeable toner particles dispersed in a first liquid carrier,
  removing at least some of the liquid carrier from the initial liquid electrostatic ink composition using supercritical fluid extraction to provide a concentrated composition comprising the chargeable toner particles, adding a second liquid carrier to the concentrated composition to form a final liquid electrostatic ink composition. In an aspect, there is also provided a liquid electrostatic ink composition producible by the method disclosed herein.

The present inventors sought a way to concentrate an electrostatic ink composition, such that the concentrated composition can be stored and/or transported as desired, then redilute the concentrated composition, so that it can be used in an electrostatic printing process. In particular, the concentration and redilution should, ideally, have little, if any, effect on the particle sizes and particle conductivities of the toner particles in the ink composition. The present inventors have found that some ways of concentration and redilution can have a detrimental effect on particle size, e.g. by promoting agglomeration of particles, and/or particle charge. Additionally, the concentration and dilution should ideally be as energy efficient as possible. The present inventors have found that some methods of concentration require very high amounts of energy to concentrate an ink beyond a certain solids content. The present inventors found examples of the method described herein do not seem to affect particle size to any great extent, nor, in some cases, particle charge, while allowing for low concentration fluids to be highly concentrated using reasonable amounts of energy, and then rediluted again, for use in an electrostatic printing process. In some examples, the method has the effect of increasing particle charge, while not having any significant effect on particle size.

The initial liquid electrostatic ink composition comprises chargeable toner particles in a first liquid carrier. The chargeable toner particles may comprise a resin. In some examples, the chargeable particles may comprise a resin and a colorant, such as a pigment. The pigment may impart a colour to the electrostatic ink composition, and the colour may be selected from cyan, magenta, yellow, black and white.

The chargeable toner particles in the initial liquid electrostatic ink composition and/or the concentrated composition and/or the final liquid electrostatic ink composition may have a volume median diameter, which may be termed d(0.5), of from 0.1 μm to 100 μm, in some examples of from 0.5 μm to 50 μm, in some examples of from 1 μm to 20 μm, in some examples from 1 μm to 10 μm, in some examples from 3 μm to 8 μm.

Volume median diameter may be measured, for example, using laser diffraction particle size analysis. Instruments for carrying out such measurements are commercially available, e.g. the Malvern Mastersizer range of particle size analyzers.

The resin preferably includes a thermoplastic polymer. In particular, the polymer of the resin may be selected from ethylene acrylic acid copolymers; ethylene methacrylic acid copolymers; ethylene vinyl acetate copolymers; copolymers of ethylene (e.g. 80 wt % to 99.9 wt %) and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl is optionally from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

Generally, the first liquid carrier acts as a dispersing medium for the other components in the ink. For example, the first liquid carrier can comprise or be a liquid selected from a hydrocarbon, a silicone oil and a vegetable oil. The first liquid carrier can include, but is not limited to, an insulating, non-polar, non-aqueous liquid that is used as the medium for toner particles. The first liquid carrier can include compounds that have a resistivity in excess of about $10^9$ ohm-cm. The first liquid carrier may have a dielectric constant below about 10, optionally below about 5, optionally below about 3. The first liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. The first liquid carrier may be selected from aliphatic hydrocarbons, isoparaffinic compounds, paraffinic compounds, dearomatized hydrocarbon compounds, and the like. In particular, the liquid carriers can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

In some examples, the first liquid carrier, before the supercritical fluid extraction, constitutes about 20 to 99.5% by weight of the initial liquid electrostatic ink composition, optionally 50 to 99.5% by weight of the initial liquid electrostatic ink composition. In some examples, the first liquid carrier, before the supercritical fluid extraction, constitutes about 40 to 90% by weight of initial liquid electrostatic ink composition. In some examples, before the supercritical fluid extraction, the liquid carrier constitutes about 60 to 80% by weight of the initial liquid electrostatic ink composition. In some examples, before the supercritical fluid extraction, the first liquid carrier may constitute about 90 to 99.5% by weight of the initial liquid electrostatic ink composition, optionally 95 to 99% by weight of the initial liquid electrostatic ink composition.

The initial liquid electrostatic composition may comprise may comprise 80% by weight or less solids, in some examples 70% by weight or less solids, in some examples 60 by weight or less solids, in some examples 50% by weight or less solids, in some examples 40% by weight or less solids, in some examples 30% by weight or less solids, in some examples 20% by weight or less solids, in some examples 10% by weight or less solids, in some examples 5% by weight or less solids.

The initial liquid electrostatic ink composition may comprise a pigment. The chargeable particles may comprise a pigment. The pigments can be any pigment compatible with the liquid carrier and useful for electrostatic printing. For example, the pigment may be present as pigment particles, or may comprise a resin (in addition to the polymers described herein) and a pigment. The resins and pigments can be any of those commonly used as known in the art. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200.

The initial liquid electrostatic ink composition may include a charge director. A charge director is added to the liquid carrier in order to impart an electrostatic charge on the ink particles. In some examples, the charge director can include a sulfosuccinate salt of the general formula $MA_n$, wherein M is a metal, n is the valence of M, and A is of the general formula $[R_1—O—C(O)CH_2CH(SO_3^-)C(O)—O—R_2]$, where each of $R_1$ and $R_2$ is an alkyl group. For example, the charge director can include nanoparticles of a simple salt and a sulfosuccinate salt of the general formula $MA_n$, wherein M is a metal, n is the valence of M, and A is an on of the general formula $[R_1—O—C(O)CH_2CH(SO_3^-)C(O)—O—R_2]$, where each of $R_1$ and $R_2$ is an alkyl group, or other charge component as found in WO2007130069, which is incorporated herein by reference in its entirety. In some examples the charge director may be selected from ionic compounds, such as metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc.

The initial liquid electrostatic ink composition may comprise one or more additives, for example a charge adjuvant, a wax, a surfactant, biocides, organic solvents, viscosity modifiers, materials for pH adjustment, sequestering agents, preservatives, compatibility additives, emulsifiers and the like.

The method involves removing at least some of the liquid carrier from the initial liquid electrostatic ink composition using supercritical fluid extraction to provide a concentrated composition comprising the chargeable toner particles. The concentrated composition has a higher solids content (and therefore a lower amount of liquid carrier) than the initial liquid electrostatic ink composition. Supercritical fluid extraction can be defined as the process of separating one component (in this case the liquid carrier) from another (in this case the other components of the initial liquid electrostatic ink composition). The supercritical fluid extraction may involve contacting a supercritical fluid with the initial liquid, such that at least some of the liquid carrier is taken into the supercritical fluid, and then separating the supercritical fluid from the remaining ink composition to leave the concentrated ink composition. The supercritical fluid may be selected from $CO_2$, $N_2$, trifluoromethane ($CHF_3$), tetrafluoroethylene ($CF_2=CF_2$), 1,1,2,2-tetrafluoroethane ($CHF_2CHF_2$), pentafluoroethane ($CF_3CHF_2$), ethene, ethane, propane, water, ethanol, and methanol. In some examples, the supercritical fluid comprises, consists essentially of or consists of $CO_2$.

The supercritical fluid extraction may involve contacting a supercritical fluid with the initial liquid electrostatic ink composition, wherein the supercritical fluid is in a static state in an extraction chamber, and then inducing mass flow of the supercritical fluid past the liquid electrostatic ink composition, e.g. by circulating the supercritical fluid around a circuit in fluid connection with the extraction chamber. "In a static state" indicates that no mass flow, e.g. circulation, of the supercritical fluid occurs in this state. The supercritical fluid extraction may involve contacting the supercritical fluid with the initial liquid electrostatic ink composition for a first period of time, wherein the supercritical fluid is in a static state in an extraction chamber, and then circulating the supercritical fluid around a circuit in fluid connection with the extraction chamber for a second period of time. The first period of time may be a time sufficient so that the supercritical fluid penetrates the complete volume of the initial liquid electrostatic ink composition. The first period of time may be at least 30 minutes, in some examples at least 40 minutes, in some examples at least 50 minutes, in some examples at least 60 minutes, in some examples from 30 minutes to 90 minutes, in some examples from 40 minutes to 80 minutes, in some examples from 50 minutes to 110 minutes, in some examples about 60 minutes. The second period of time may be at least 60 minutes, in some examples at least 70 minutes, in some examples at least 80 minutes, in some examples at least 90 minutes, in some examples from 60 minutes to 120 minutes, in some examples from 70 minutes to 110 minutes, in some examples from 80 minutes to 100 minutes.

The supercritical fluid extraction may involve contacting $CO_2$ with the initial liquid, wherein the $CO_2$ is at a pressure of at least 74 bar, and at a temperature of at least 31 ° C. The supercritical fluid extraction may involve contacting $CO_2$ with the initial liquid, wherein the $CO_2$ is at a pressure of at least 90 bar, in some examples at least 100 bar, in some examples at least 110 bar, and in some examples at least 120 bar and at a temperature of at least 31 ° C., in some examples at least 35 ° C., in some examples at least 38 ° C., in some examples at least 40 ° C. The supercritical fluid extraction may involve contacting $CO_2$ with the initial liquid, wherein the $CO_2$ is at a pressure of at least 110 bar and at a temperature of at least 35 ° C.

Following the supercritical fluid extraction and before adding a second liquid carrier, the concentrated composition comprising the chargeable toner particles may transferred to a storage vessel. The storage vessel may be any suitable container for an ink for an electrostatic printing process. In some examples, the ink is transferred to a storage vessel, which is then sealed. The sealed storage vessel containing the ink for the electrostatic printing process can then be transported as desired, for example to another site, where printing may take place.

In some examples, the method may further involve, after producing the concentrated composition and transferring it to a storage vessel, transporting the concentrated in composition in the storage vessel to another site, then adding the second liquid carrier to reduce the solids content in weight percent (for example from a solids content of 70 wt % or more, in some examples 80 wt % or more, to a solids content of 10 wt % or less, in some examples 5 wt % or less), and, in some examples. then using the ink in an electrostatic printing process.

The concentrated ink composition comprising the chargeable toner particles, after the supercritical fluid extraction, may comprise 30% by weight or more solids, in some examples 40% by weight or more solids, in some examples 50% by weight or more solids, in some examples 60% by weight or more solids, in some examples 70% by weight or more solids, in some examples 80% by weight or more solids, in some examples 90% by weight or more solids, in some examples 95% by weight or more solids.

The method may involve adding a second liquid carrier to the concentrated composition to form a final liquid electrostatic ink composition. The second liquid carrier may be the same as or different from the first liquid carrier. For example, the second liquid carrier can comprise or be a liquid selected from a hydrocarbon, a silicone oil and a vegetable oil. The second liquid carrier can include, but is not limited to, an insulating, non-polar, non-aqueous liquid that is used as the medium for toner particles. The second liquid carrier can include compounds that have a resistivity in excess of about $10^9$ ohm-cm. The second liquid carrier may have a dielectric constant below about 10, optionally below about 5, optionally below about 3. The second liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. The second liquid carrier may be selected from aliphatic hydrocarbons, isoparaffinic compounds, paraffinic compounds, dearomatized hydrocarbon compounds, and the like. In particular, the liquid carriers can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™(each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

In some examples, the method may involve adding a second liquid carrier to the concentrated composition and agitating the resultant mixture to form a final liquid electrostatic ink composition. The agitating may involve imparting shear forces to the second liquid carrier and the concentrated composition, e.g. by stirring or shaking the combination of the second liquid carrier and the concentrated composition. The agitating may involve stirring the combination of the second liquid carrier and the concentrated composition with a stirrer rotating at a speed of at least 100 rpm, in some examples at least 1000 rpm, in some examples at least 3000 rpm, in some examples at least 4000 rpm, in some examples at least 5000 rpm, in some examples at least 6000 rpm, in some examples at least 8000 rpm, in some examples at least 10000 rpm, in some examples at least 11000 rpm, in some examples at least 12000 rpm, in some examples at least 15000 rpm, in some examples at least 20000 rpm. The stirring may be carried out until the toner particles are homogenously dispersed in the final liquid electrostatic composition. The stirring may be carried out for a period of at least 1 second, in some examples at least 5 second, in some examples from 5 seconds to 1 minute, in some examples from 5 seconds to 30 seconds, in some examples from 1 to 30 minutes, in some examples a period of from 5 to 20 minutes.

The final liquid electrostatic composition may comprise may comprise 80% by weight or less solids, in some examples 70% by weight or less solids, in some examples 60 by weight or less solids, in some examples 50% by weight or less solids, in some examples 40% by weight or less solids, in some examples 30% by weight or less solids, in some examples 20% by weight or less solids, in some examples 10% by weight or less solids, in some examples 5% by weight or less solids.

In some examples the initial liquid electrostatic ink composition comprises 30% by weight or less solids, the concentrated composition comprises 80% by weight or more solids, and the final liquid electrostatic ink composition comprises 30% by weight or less solids, in some examples 20% by weight or less solids, in some examples 10 by weight or less solids.

In some examples, the method involves using centrifugation, filtration or electrophoresis, for example to concentrate an initial electrostatic ink composition before or after concentration with supercritical fluid extraction. In some examples, the method does not involve any concentration using centrifugation, filtration or electrophoresis.

The final liquid electrostatic ink composition may be used in an electrostatic printing process. The electrostatic printing process may involve
providing the final electrostatic ink composition;
forming a latent electrostatic image on a surface;
contacting the surface with the final electrostatic ink composition, such that at least some of the chargeable toner particles adhere to the surface to form a developed toner image on the surface, and transferring the toner image to a print substrate.

The surface on which the latent electrostatic image is formed may be on a rotating member, e.g. in the form of a cylinder. The surface on which the latent electrostatic image is formed may form part of a photo imaging plate (PIP). The contacting may involve passing the electrostatic composition of the first aspect between a stationary electrode and a rotating member, which may be a member having the surface having a latent electrostatic image thereon or a member in contact with the surface having a latent electrostatic image thereon. A voltage is applied between the stationary electrode and the rotating member, such that the particles adhere to the surface of the rotating member. This may involve subjecting the electrostatic ink composition to an electric field having a field gradient of 1000 V/cm or more, in some examples 1500 V/cm or more.

The intermediate transfer member may be a rotating flexible member, which is in some examples heated, e.g. to a temperature of from 80 to 160 ° C. The print substrate may be any suitable substrate. The substrate may be any suitable substrate capable of having an image printed thereon. The substrate may comprise a material selected from an organic or inorganic material. The material may comprise a natural polymeric material, e.g. cellulose. The material may comprise a synthetic polymeric material, e.g. a polymer formed from alkylene monomers, including, but not limited to, polyethylene and polypropylene, and co-polymers such as styrene-polybutadiene. The polypropylene may in some examples be biaxially orientated polypropylene. The material may comprise a metal, which may be in sheet form. The metal may be selected from or made from, for instance, aluminum (Al), silver (Ag), tin (Sn), copper (Cu), mixtures thereof. In some examples, the print substrate comprises a cellulosic paper. In some examples, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The print substrate is in some examples a cellulosic print substrate such as paper. The cellulosic print substrate is in some examples a coated cellulosic print substrate, e.g. having a coating of a polymeric material thereon.

EXAMPLES

The following illustrates examples of the method and other aspects described herein. Thus, these Examples should not be considered as limitations of the present disclosure, but are merely in place to teach how to make or employ examples of the present disclosure.

Example 1

Concentration and Re-dispersion of ElectroInk® Cyan

A five liter extractor pilot system for was used for the supercritical carbon dioxide extraction. Commercial ink (Electroink® Cyan 4.5) (23% w/w solids) was provided by HP Indigo. The ink was diluted with Isopar L to 10% w/w solids. 995 gr. of the diluted LEP ink was placed in the extractor. The extractor was first statically pressurized (120 bars at 40° C.) and was isolated from the solvent circuit for 60 min. The latter was conducted to enable the $CO_2$ to penetrate the complete volume of the sample. After 60Min, dynamic extraction (with mass flow) was started. The extraction time was 90 min. The solid content after Isopar extraction was 95.8%. Solid content was determined gravimetrically. A mass of 1.5 gr concentrated ink was placed on a pre-weighted aluminum dish (used for solid content determination). The dish containing the tested ink was weighed before placing it on a pre-heated electrical hot plate at 200 for 20 min. The mass of the dish containing dried ink was determined after cooling the dish.

The concentrated material was redispersed using two different dispersing tools:
1. High shear mixer (HSM) from IKA Germany (Ultra Turax T-50)—1400 gr. Dispersion of 2% solids ink was prepared as follows. 28.57 gr. of the concentrated ink was placed in a 2 liter plastic container 1371.4 gr. Isopar L were added. The container was cooled in a water bath. Re-dispersion was carried for 15 min at 6000 RPM. Particle size and particle conductivity (PC) were determined for the 2% solids solution that was obtained.

The resulted ink was printed on an HP indigo 7000 series printing system. The printed results were comparable to non-concentrated ink.
2. Laboratory blender from Waring products USA—45 grams of extracted ink and 255 gr. of Isopar L were blended at a speed of 12000 RPM for 8 min to obtain re-dispersed ink at 15% solids. Particle size and particle conductivity (PC) were determined for 2% solids solutions obtained by dilution of the re-dispersed ink.

E.I from a can (23% solids) was dispersed in the blender in the same manner The particle conductivity and particle size of the LEP ink are compared in Table 1.

Example 2

Concentration and Re-dispersion of Electroink® White+

Again, a five liter extractor pilot system for was used for the supercritical carbon dioxide extraction. Commercial ink (Electroink® White+) (30% w/w) was provided by HP Indigo. The ink was diluted with Isopar to 12.2 solids. 1455 gr. of the diluted LEP ink was placed in the extractor. The extractor was first statically pressurized (120 bars at 40° C.) and was isolated form the solvent circuit for 30 min. The latter was conducted to enable the CO2 to penetrate the complete volume of the sample. After 60 Min, dynamic extraction (with mass flow) was started. The extraction time was 100 min. Solid content was determined gravimetrically (see example 1). The LEP white ink was found to be concentrated to 99% solids. The concentrated material was redispersed by a laboratory blender from Waring products USA—40 grams of extracted ink and 160 gr. of Isopar L were blended at a speed of 12000 RPM for 4 min to obtain re-dispersed ink at 20% solids. Particle size and particle conductivity (PC) were determined for 4 solids solutions obtained by dilution of the re-dispersed ink.

The particle conductivity and particle size of the LEP ink are compared in Table 1. The difference in the PC values lies within the spec of this white ink which is relatively wide.

TABLE 1

| | Particle size [µm] | | | Particle Conductivity |
|---|---|---|---|---|
| | d(0.1) | d(0.5) | d(0.9) | [pmho/cm] |
| E.I 4.5 cyan from can | 2.6 | 5.5 | 12.3 | 105 |
| redispersed cyan by H.S.M after SPC CO2 concentration | 2.5 | 5.6 | 12.6 | 120 |
| redispersed by 2. Laboratory blender after SPC CO2 concentration | 2.5 | 5.6 | 12.5 | 110 |
| E.I white + from can | 3.3 | 7.5 | 16.6 | |
| redispersed by 2. Laboratory blender after SPC CO2 concentration | 2.9 | 6.6 | 14.7 | 125 |

Particle size for d(0.1), d(0.5) and d(0.9) was measured using a Malvern Mastersizer, which uses laser diffraction particle size analysis. d(0.5) is the volume median diameter, where 50% of the distribution is above and 50% below the stated particle size. d(0.1) indicates that 10% of the volume distribution is below the stated value of particle size. d(0.9) indicates that 90% of the volume distribution is below the stated particle size.

Particle Conductivity is derived from measurements for the high field and low field conductivities of the ink composition, as explained below. High field conductivity (HFC) is measured in pmho/cm. This term defines the current collected under the application of a high electric field where charged/ionized Electroink particles and charged/ionized. High field conductivity was measured at 1500 V/mm using a DC current at 23° C. LF indicates the low field.

Low field conductivity (LFC) is measured in pmho/cm. This term refer to the charged/ionized species that can be developed under low electric field. Low field conductivity was measured by applying a constant amplitude AC voltage to two parallel electrodes and monitoring the current via the fluid—in this instance, the electric field amplitude was 5 V/mm, frequency was 5 Hz, and the temperature was 23° C.

The difference between HFC and LFC estimates the ink particle conductivity (PC); this can also be expressed by HFC−LFC=PC.

While the method and related aspects have been described with reference to certain examples, those skilled in the art will appreciate that various modifications, changes, omissions, and substitutions can be made without departing from the spirit of the disclosure. It is intended, therefore, that the compositions and related aspects be limited by the scope of the following claims. The features of any dependent claim can be combined with the features of any of the other dependent claims, and any independent claim.

The invention claimed is:

1. A method for processing a liquid electrostatic ink composition, the method comprising:
   providing an initial liquid electrostatic ink composition comprising chargeable toner particles dispersed in a first liquid carrier,
   removing at least some of the liquid carrier from the initial liquid electrostatic ink composition using supercritical fluid extraction to provide a concentrated composition comprising the chargeable toner particles, wherein the supercritical fluid extraction involves contacting a supercritical fluid with the initial liquid electrostatic ink composition, wherein the supercritical fluid is in a static state in an extraction chamber, and then inducing mass flow of the supercritical fluid past the liquid electrostatic ink composition, and
   adding a second liquid carrier to the concentrated composition to form a final liquid electrostatic ink composition.

2. The method according to claim 1, wherein the supercritical fluid used in the supercritical fluid extraction comprises $CO_2$.

3. The method according to claim 1, wherein the supercritical fluid extraction involves contacting $CO_2$ with the initial liquid electrostatic ink composition, wherein the $CO_2$ is at a pressure of at least 110 bar and at a temperature of at least 35° C.

4. The method according to claim 1, wherein inducing mass flow of the supercritical fluid past the liquid electrostatic ink composition is by circulating the supercritical fluid around a circuit in fluid connection with the extraction chamber.

5. The method according to claim 1, wherein the supercritical fluid extraction involves contacting the supercritical fluid with the initial liquid electrostatic ink composition for a first period of time, wherein the supercritical fluid is in a static state in an extraction chamber, and then circulating the supercritical fluid around a circuit in fluid connection with the extraction chamber for a second period of time, wherein the first period of time is less than the second period of time.

6. The method according to claim 5, wherein the first period of time is at least 30 minutes, and the second period of time is at least 60 minutes.

7. The method according to claim 1, wherein the method does not involve any concentration using centrifugation, filtration, or electrophoresis.

8. The method according to claim 1, wherein the initial liquid electrostatic ink composition comprises 30% by weight or less solids, the concentrated composition comprises 80% by weight or more solids, and the final liquid electrostatic ink composition comprises 10% by weight or less solids.

9. The method of claim 1, wherein the method involves adding the second liquid carrier to the concentrated composition and agitating the resultant mixture to form a final liquid electrostatic ink composition.

10. The method of claim 9, wherein the agitating involves involve stirring the combination of the second liquid carrier and the concentrated composition with a stirrer rotating at a speed of at least 4000 rpm.

11. The method of claim 9, wherein the agitating involves involve stirring the combination of the second liquid carrier and the concentrated composition with a stirrer rotating at a speed of at least 7000 rpm.

12. The method of claim 10, wherein the stirring is carried out for a period of from 5 seconds to 20 minutes.

13. The method of claim 1, wherein the chargeable toner particles in the initial liquid electrostatic ink composition and/or the concentrated composition and/or the final liquid electrostatic ink composition have a volume median diameter, d(0.5), of from 2 μm to 10 μm.

14. The method of claim 1, wherein the supercritical fluid used in the supercritical fluid extraction comprises $CO_2$, $N_2$, trifluoromethane, tetrafluoroethylene, 1,1,2,2-tetrafluoroethane, pentafluoroethane, ethene, ethane, propane, water, ethanol, or methanol.

15. The method of claim 1, further comprising transferring the concentrated composition to a vessel before adding the second liquid.

16. The method of claim 1, wherein the second liquid carrier has a dielectric constant below 10.

* * * * *

UNITED STATES PATENT AND TRADEMARK OFFICE
CERTIFICATE OF CORRECTION

PATENT NO. : 9,709,913 B2  
APPLICATION NO. : 15/104034  
DATED : July 18, 2017  
INVENTOR(S) : Mark Sandler et al.

Page 1 of 1

It is certified that error appears in the above-identified patent and that said Letters Patent is hereby corrected as shown below:

On the Title Page

In item (72), Inventors, in Column 1, Line 1, delete "Nes Ziona" and insert -- Ness Ziona --, therefor.

In item (72), Inventors, in Column 1, Line 2, delete "Nes Ziona" and insert -- Ness Ziona --, therefor.

In item (72), Inventors, in Column 1, Line 3, delete "Nes Ziona" and insert -- Ness Ziona --, therefor.

In item (72), Inventors, in Column 1, Line 4, delete "Nes Ziona" and insert -- Ness Ziona --, therefor.

Signed and Sealed this  
Twenty-sixth Day of December, 2017

Joseph Matal  
*Performing the Functions and Duties of the*  
*Under Secretary of Commerce for Intellectual Property and*  
*Director of the United States Patent and Trademark Office*